April 17, 1962  H. N. LUIJT  3,029,916
COMBINED BRAKE AND ACCELERATOR PEDAL
Filed May 20, 1960  4 Sheets-Sheet 1

INVENTOR.
HERMANUS N. LUIJT
BY
McMorrow, Berman + Davidson
ATTORNEYS

April 17, 1962　　　　　H. N. LUIJT　　　　　3,029,916
COMBINED BRAKE AND ACCELERATOR PEDAL
Filed May 20, 1960　　　　　　　　　　　　　4 Sheets-Sheet 2

INVENTOR.
HERMANUS N. LUIJT
BY
McMorrow, Berman & Davidson
ATTORNEYS

April 17, 1962 H. N. LUIJT 3,029,916
COMBINED BRAKE AND ACCELERATOR PEDAL
Filed May 20, 1960 4 Sheets-Sheet 3
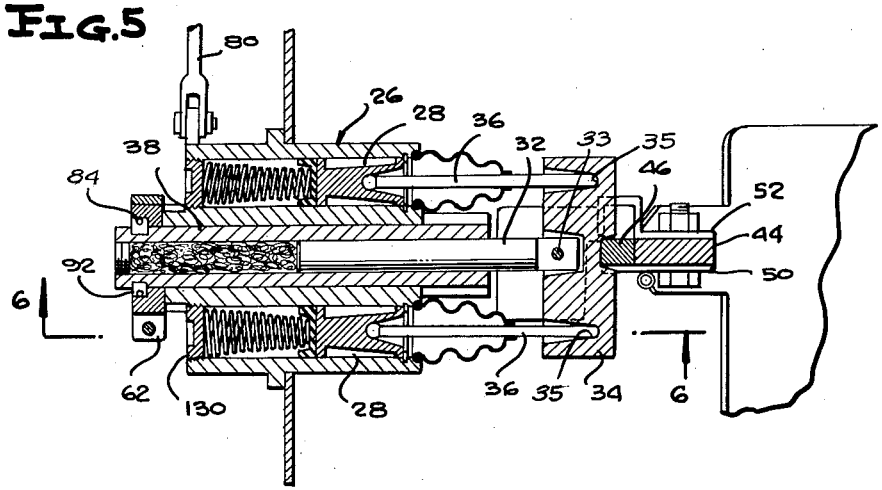
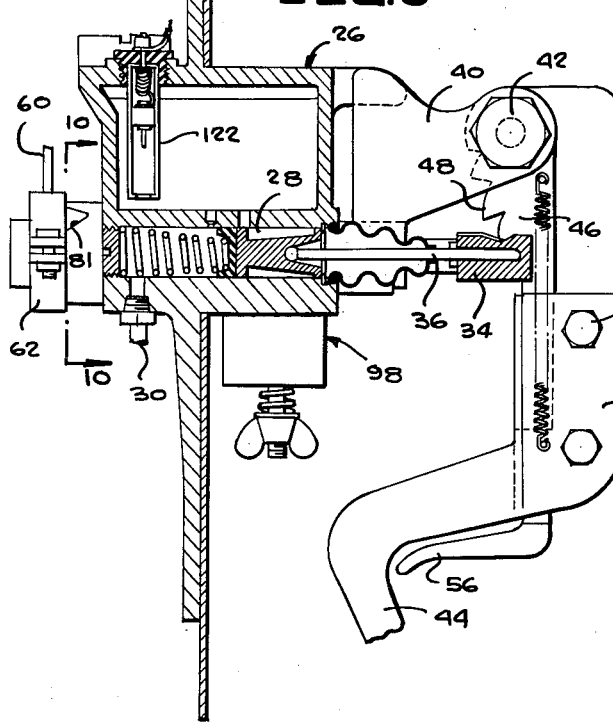
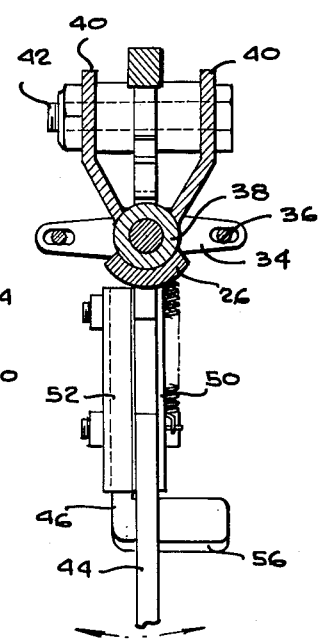
INVENTOR.
HERMANUS N. LUIJT
BY
McMorrow, Berman & Davidson
ATTORNEYS

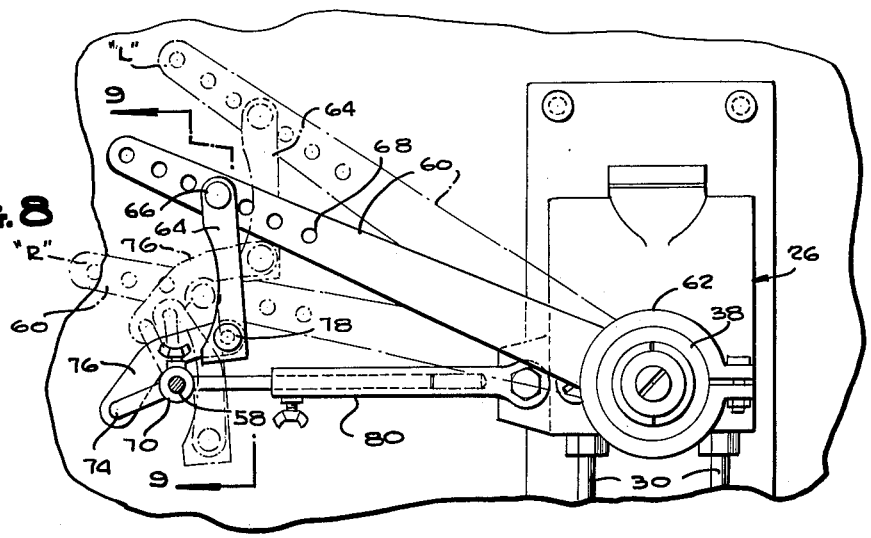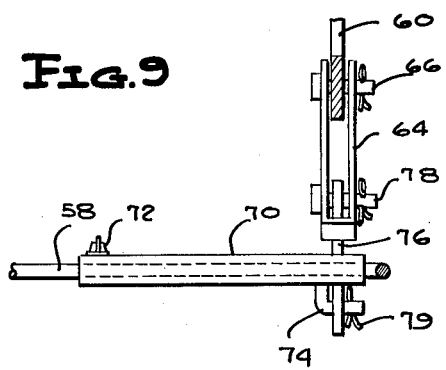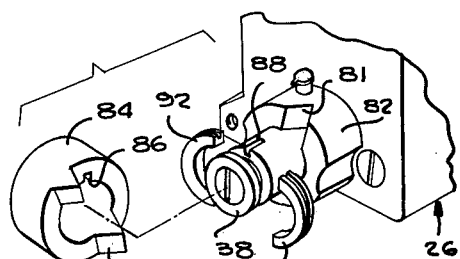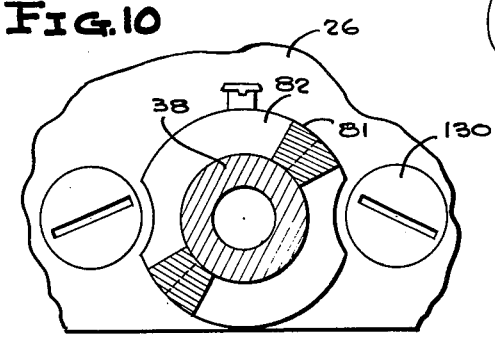

United States Patent Office 3,029,916
Patented Apr. 17, 1962

3,029,916
COMBINED BRAKE AND ACCELERATOR PEDAL
Hermanus N. Luijt, 4105 Glencoe Ave., Venice, Calif.
Filed May 20, 1960, Ser. No. 30,511
3 Claims. (Cl. 192—3)

The present invention relates to automotive brake pedals and throttle control means generally and in particular to a combined brake and accelerator pedal.

Automotive vehicles are presently equipped with an accelerator pedal and a brake pedal. It is a known fact that in the interval of time that it takes the operator of a vehicle to shift his foot from the accelerator pedal to the brake pedal, the vehicle travels a considerable distance varying with the speed of the vehicle. Accidents are partially caused by this slight delay in applying the brakes necessitated by movement of the foot off of the accelerator pedal and onto the brake pedal.

Previously proposed have been combination brake and accelerator pedals intended for operation by one foot of the operator of a vehicle. The pedals proposed have not been generally acceptable for various reasons. A main reason for the non-acceptance of the proposed pedals is that they required unnatural movement of the foot of the operator in either the brake applying position or the accelerator engaging position.

An object of the present invention is to provide a combined brake and accelerator pedal in which the throttle means may be shifted to open position by either moving the pedal to the right or to the left of a neutral position.

Another object of the present invention is to provide a combination brake and accelerator pedal in which means is provided for automatically shifting the pedal to the throttle closed position upon application of brake pressure to the pedal.

A further object of the present invention is to provide a combination brake and accelerator pedal which may be instantly and automatically shifted to the brake applying position from the throttle open position with a single coordinated movement of the foot of the operator of a vehicle in which the pedal is installed.

A still further object of the present invention is to provide a combination brake and accelerator pedal which is simple in structure, one sturdily constructed and having long life characteristics, one requiring a minimum of maintenance and servicing over a relatively long period of time, and one which is economically feasible.

These and other objects and advantages of the present invention will be fully apparent from the following description when taken in conjunction with the annexed drawings, in which:

FIGURE 5 is a view taken on the line 5—5 of FIGURE 3;

FIGURE 6 is a view taken on the line 6—6 of FIGURE 5;

FIGURE 7 is a view taken on the line 7—7 of FIGURE 3;

FIGURE 8 is a view on an enlarged scale, taken on the line 8—8 of FIGURE 1;

FIGURE 9 is a view taken on the line 9—9 of FIGURE 8;

FIGURE 10 is a view taken on the line 10—10 of FIGURE 6 and on an enlarged scale; and, FIGURE 11 is an isometric exploded view of the assembly shown in FIGURE 10.

Figure 2:
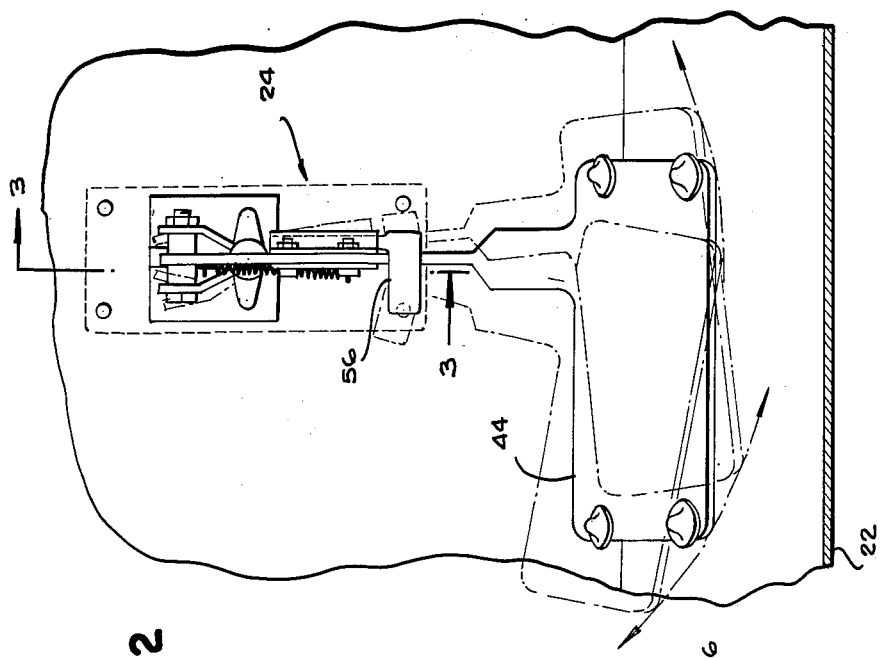
FIGURE 2 is a view taken on line 2—2 of FIGURE 1.
Figure 1:
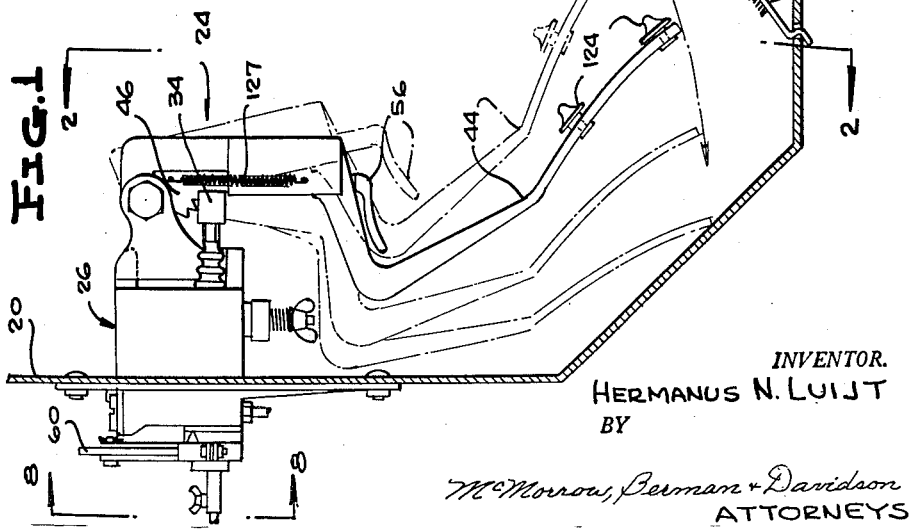
FIGURE 1 is a view in section of the portion of the floor and fire wall of a vehicle forwardly of an operator's seat, showing the combined brake and accelerator pedal of the present invention installed thereon, the dotted line showings indicating the various positions of the brake pedal during operation of the vehicle.

Referring in greater detail to the drawings in which like numerals indicate like parts throughout the several views, with reference to FIGURES 1 and 2, the reference numeral 20 designates a portion of the fire wall of an automotive vehicle and reference numeral 22 designates a portion of the floor of the vehicle. The device of the present invention is designated generally by the reference numeral 24 and it comprises a housing 26 in which are two hydraulic brake master cylinders 28 of conventional design and connected by conventional conduit means, as at 30 in FIGURE 8, to the brake cylinders of the vehicle. The brake cylinders of the vehicle are not shown as not forming a part of the present invention.

A brake applying actuator 32 is mounted in the housing 26 for linear forward and backward movement in a horizontal plane. As shown most clearly in FIGURES 5 and 6, the actuator is disposed between the two master cylinders 28, and a block element 34 is positioned adjacent one end of the actuator 32 and is secured to the actuator 32 adjacent said one end, as at 33, the block element being provided with inwardly-extending recesses 35 which loosely receive the ends of the reciprocable plungers 36 which operate the master cylinders 28.

A bushing 38 is mounted in the housing 26 for rotation in clockwise and counterclockwise direction about the actuator 32 as an axis. A pair of ears 40 extend upwardly from one end of the bushing 38.

A pivot pin 42 extends between the ears 40 and is normally horizontal in its position transversely of the actuator 32.

A pedal 44, arranged in an upwardly sloping direction has its upper end connected to the pivot pin 42 for inward and outward movement toward and away from the housing 26. An abutment member 46 is adjustably carried by the pedal 44 and normally loosely engages the block element 34, as shown most clearly in FIGURES 5 and 6.

The abutment member 46 is provided with a plurality of abutment faces 48 each of which is selectively engageable with the block element 34 upon upward shifting of the abutment member 46 in a channel carried by the upper end portion of the pedal 44, the channel being formed by plates 50 and 52 secured by bolts 54 to the upper end portion of the pedal 44, as shown most clearly in FIGURE 5.

The abutment member 46 has a toe piece 56 which may be engaged by the toe of an individual for the purpose of shifting the abutment member 46 upwardly or downwardly so as to engage one or the other of the faces 48. This positions the pedal 44 in any one of the three dotted line positions shown in FIGURE 1 with respect to the full line position so as to accommodate vehicle operators of different stature.

In FIGURES 8 and 9, the reference numeral 58 designates the throttle control rod of the vehicle engine. Means is provided connecting the rod 58 to the bushing 38 so that upon application of a laterally directed pressure to the pedal 44 in either the left or right hand direction, the bushing 38 will rotate and actuate the throttle control rod 58 to the throttle open position from a normal throttle closed position. This means consists in an arm 60 projecting perpendicularly from a split ring 62 adjustably mounted upon the end portion of the bushing 38 remote from the pedal 44.

Linkage means is employed to connect the free end of the arm 60 to the rod 58 for rotating the rod 58 in response to rotation of the bushing 38. This linkage means consists of an upper link 64 formed of a piece of strap material bent to a U-shape, as shown most clearly in FIGURE 9. The upper ends of the U-shaped link 64 are pivotally connected by a pin 66 to the arm 60 in any one of a series of spaced holes 68 in the arm 60.

A sleeve 70 is secured on the rod 58 by a wing bolt 72 and crank arm 74 projects from the sleeve 70 adjacent one end of the latter. Another link 76 has one end connected by a pin 78 to the lower end of the link 64 and has its other end connected to the crank arm 74. Cotter pins 79 secure the pins 66 and 78 in the link 64 and the lower end portion of the link 76 to the crank arm 74.

The normal position of the arm 60 is shown in full lines in FIGURE 8. When the pedal 44 is moved to the left the arm 60 assumes a dotted line position marked "L." When the pedal 44 is moved to the right, the arm 60 assumes the position "R" as shown in dotted lines in FIGURE 8.

Due to the knee action of the links 64 and 76, as shown in FIGURE 8, in either the "L" position or the "R" position the rod 58 has been turned to the throttle open position. When the arm 60 is in the full line position, the rod 58 is in the throttle closed position.

An adjustable support 80 maintains the rod 58 at a predetermined distance away from the housing 26.

Means is provided operatively connected to the bushing 38 and operable upon the application of a brake applying pressure to the pedal 44 when the latter is in either the left hand or the right hand position in which the throttle rod 58 is in the open position to effect the shifting of the pedal 44 to the throttle closed position. This means is shown in FIGURES 10 and 11 and it includes a notch 81 in the outer face of the ring 82 which is fixedly secured to and projects from the housing 26. A collar 84 is secured by cooperating key and keyway means, as at 86 and 88, in the ring 82 and the bushing 38, respectively. The collar 84 is provided with a projection 90 which fits in the notch 81 in the ring 82. The angularity of the notch 81 and the projection 90 is shown exaggerated. Upon rotation of the bushing 38 the collar 84 is carried with it so that the projection 90 slides out of the notch 81 to one side or the other according to the rotation of the bushing 38 in response to left or right hand movement of the pedal 44.

When the pedal 44 is either in the left hand or right hand position and pressure is applied to put on the brakes, the projection 90 seeks to enter the notch 81, this returns the throttle control rod 58 to the throttle closed position.

With reference to FIGURES 5 and 11, the collar 84 is assembled upon the adjacent end of the bushing 38 by means of a pair of half rings 92 provided on their outer peripheries with a groove receiving a snap ring 94 which also is received in a groove provided on the inner periphery of the collar 84 adjacent the end remote from the projection 90. The collar 84 is assembled on the bushing 38 when the bushing 38 has been pushed through the housing 26 a distance permitted by the space between the ears 40 and the adjacent part of the housing 26, such space being shown most clearly in FIGURE 3 and designated by the numeral 96.

Figure 4:
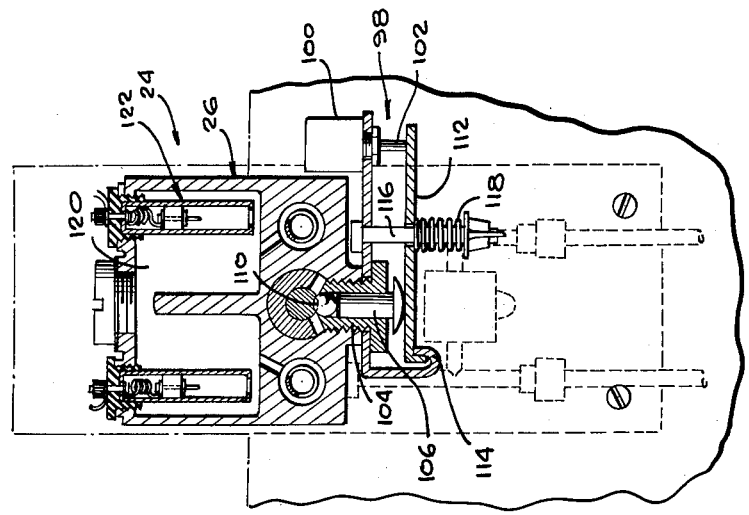
FIGURE 4 is a view taken on the line 4—4 of FIGURE 3.
Figure 3:
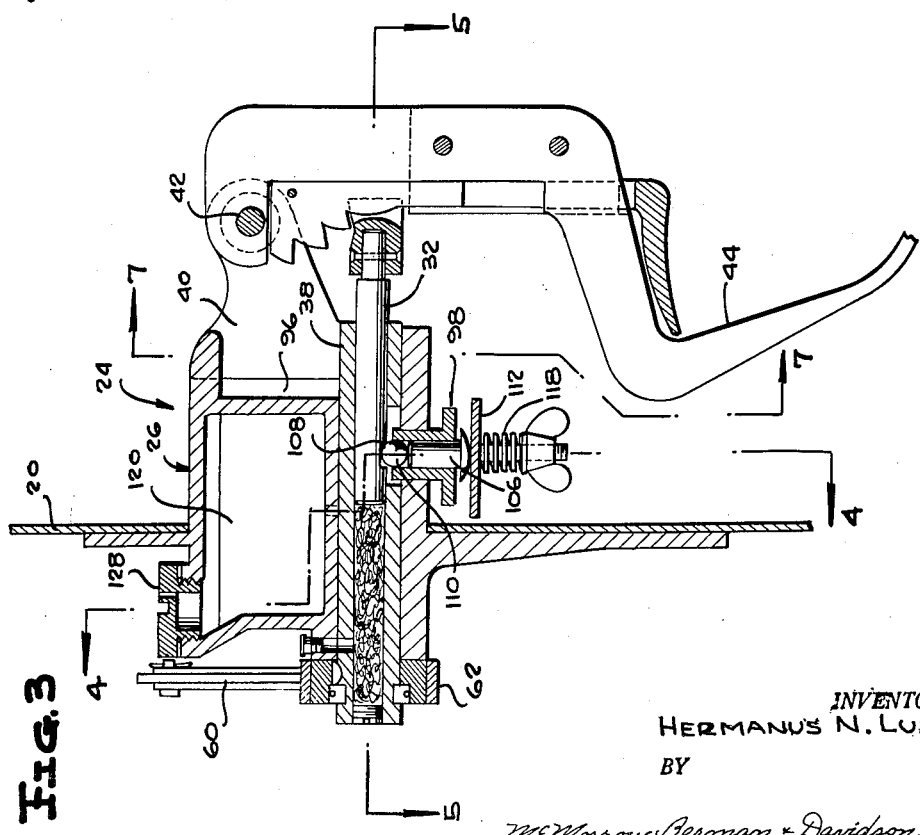
FIGURE 3 is a view taken on line 3—3 of FIGURE 2 and on an enlarged scale.

The brake applying and throttle control pedal assembly includes a stop light and dash light switch 98 as shown most clearly in FIGURES 3 and 4.

A switch 98 includes a microswitch 100 which has a plunger 102 biased outwardly to the switch closing position by an internal spring, the spring not being shown. A plug 104 is screwed into the bottom of the housing 26 and is provided with a bore in which is slidably mounted a plunger 106.

The actuator 32 is provided with a recess indicated by dotted lines in FIGURE 3 and designated by the numeral 108. Between the top of the plunger 106 and the recess 108 is a ball 110 seated in the recess 108. The head of the plunger 106 bears on the top of a hinged plate element 112 supported at one end in a hooked bracket 114. The other end of the plate element 112 is in supporting relation with respect to the plunger 102 of the microswitch 100. An adjustable guide pin 116 has a spring 118 bearing against the underside of the plate element 112. Upon movement of the actuator 32 into the bushing 38, the ball 110 is forced out of the recess 108 and the plate element 112 is pushed down against the resistance of the spring 118, permitting the plunger 102 to project outwardly of the microswitch 100, and closing the contacts within the microswitch 100. The microswitch 100 is in circuit with the stop light and the light on the dash of the vehicle. The dash light informs the operator of the vehicle that the brakes are on or that he is riding the brake with the vehicle in motion and the pedal 44 in either the left or right hand position in which the throttle rod is in the throttle open position.

A feature of the invention resides in the fact that in the common reservoir 120 for the hydraulic fluid employed in the two master cylinders 28 are float switches 122 which indicate when the reservoir 120 must be refilled. The switches 122 are connected to suitable bulbs on the dash of the vehicle and are in circuit with the vehicle's battery so that the bulbs are illuminated when the fluid in the reservoir 120 is low.

One face of the pedal 44 is provided with abutments 124 against which the side of the foot of the operator bears to swing the pedal 44 to either the left hand or the right hand position, as shown in dotted lines in FIGURE 2.

In operation, the application of a brake applying pressure to the pedal 44 shifts the actuator inwardly of the bushing 38 and depresses the plungers 36 of the master cylinders 28. This results in applying the brakes of the vehicle.

With the brakes applied, the pedal 44 may be shifted laterally to either the left side or the right side and the throttle of the engine opened. Then with the foot releasing pressure the brakes are released and the engine may pick up speed and drive the vehicle in the direction desired.

When it is desired to decelerate it is only necessary to permit the pedal 44 to return to the neutral position under the action of the notch 81 and projection 90. This return of the pedal 44 to the neutral position is positive when the brakes are applied suddenly and permits the conventional spring of the throttle to close the throttle and decelerate the engine.

A foot rest assembly 126 is provided (FIGURE 1) and is detachably secured to the floor 22 for resting the heel of the shoe of the operator in the position with the sole of the shoe on the pedal 44. The pedal 44 may be adjusted outwardly or inwardly toward the fire wall 20 by disengaging the abutment member 46 and adjusting it upwardly or downwardly to the position in which another face 48 engages the end of the actuator 32. A spring 127 has one end secured to the abutment member 46 and the other end secured to the upper end portion of the pedal 44 and biases the abutment member 46 to the downward position. It is to be understood that the engagement of the actuator 32 is actuated through the block element 34 rather than directly.

The master cylinders 28 are provided with a common filler cap 128 and with access openings and plug closures 130, in the conventional manner.

A stop 132 on the housing 26 extends between the ears 40 and is engageable by each of the latter to limit the extent of lateral movement of the pedal 44 in either the left or right hand direction.

What is claimed is:

1. The combination with a throttle control rod, of a brake-applying and throttle-control pedal assembly comprising a housing, a bushing mounted in said housing for rotation in clockwise and counterclockwise directions, a brake-applying actuator mounted in said bushing for linear forward and backward movement, a pair of ears on said bushing, a pivot pin supported in said ears, a pedal arranged in an upwardly-sloping direction and having its upper end connected to said pivot pin for inward-and-outward movement about said pivot pin as an axis, an abutment member mounted on said pedal for upward-and-downward movement, a block element positioned adjacent one end of said actuator and secured to said actuator adjacent said one end thereof, said block element contacting said abutment member, said pedal being operable upon application of a brake-applying pressure thereto to effect the inward movement of said pedal and cause the execution of the forward movement of said actuator to the brake-applying position, and means connecting said throttle-control rod to said bushing so that upon application of laterally-directed pressure to said pedal in either a left or right-hand direction said bushing will actuate the throttle-control rod to throttle open position, said means comprising an arm projecting perpendicularly from said bushing, a sleeve secured to said throttle-control rod, a crank arm projecting from said sleeve, and linkage connecting the free end of said arm to said crank arm.

2. The combination with a throttle-control rod, of a brake-applying and throttle-control pedal assembly comprising a housing, a bushing mounted in said housing for rotation in clockwise and counterclockwise directions, a brake-applying actuator mounted in said bushing for linear forward and backward movement, a pair of ears on said bushing, a pivot pin supported in said ears, a pedal arranged in an upwardly-sloping direction and having its upper end connected to said pivot pin for inwardly-and-outward movement about said pivot pin as an axis, an abutment member mounted on said pedal for upward-and-downward movement, a block element positioned adjacent one end of said actuator and secured to said actuator adjacent said one end thereof, said block element contacting said abutment member, said pedal being operable upon application of a brake-applying pressure thereto to effect the inward movement of said pedal and cause the execution of the forward movement of said actuator to the brake-applying position, means connecting said throttle-control rod to said bushing so that upon application of laterally-directed pressure to said pedal in either a left or right-hand direction said bushing will actuate the throttle-control rod to throttle open position, said means comprising an arm projecting perpendicularly from said bushing, a sleeve secured to said throttle-control rod, a crank arm projecting from said sleeve, and linkage connecting the free end of said arm to said crank arm, and means operatively connected to said bushing and operable upon application of a brake-applying pressure to said pedal when the latter is in either the left or right-hand throttle open position to shift said pedal to the throttle closed position.

3. The combination according to claim 1, wherein said last mentioned means includes a ring on and projecting from said housing, there being a notch in said ring, a collar on said bushing, and a projection on said collar and engaging said notch.

References Cited in the file of this patent
UNITED STATES PATENTS

| | | |
|---|---|---|
| 2,452,981 | Benning | Nov. 2, 1948 |
| 2,707,036 | Hollub | Apr. 26, 1955 |
| 2,781,116 | Watson | Feb. 12, 1957 |
| 2,792,092 | Fong | May 14, 1957 |
| 2,919,773 | Fong | Jan. 5, 1960 |